United States Patent
Chin et al.

(10) Patent No.: US 6,694,155 B1
(45) Date of Patent: Feb. 17, 2004

(54) DOWNLINK BEAMFORMING METHOD

(75) Inventors: Francois Po Shin Chin, Singapore (SG); Ying Chang Liang, Singapore (SG)

(73) Assignee: National University of Singapore, Singapore (SG)

( * ) Notice: Subject to any disclaimer, the term of this patent is extended or adjusted under 35 U.S.C. 154(b) by 348 days.

(21) Appl. No.: 09/655,009

(22) Filed: Sep. 5, 2000

(30) Foreign Application Priority Data

Sep. 24, 1999 (SG) .............................................. 9904733

(51) Int. Cl.[7] .............................. H04B 1/38; H04M 1/00
(52) U.S. Cl. ........................ 455/562.1; 455/69; 455/561
(58) Field of Search .............................. 455/561, 562.1, 455/69, 63.1, 63.2, 446, 450

(56) References Cited

U.S. PATENT DOCUMENTS

| 6,041,237 A | | 3/2000 | Farsakh | |
| 6,101,399 A | * | 8/2000 | Raleigh et al. | ............. 455/561 |
| 6,141,567 A | * | 10/2000 | Youssefmir et al. | ......... 455/562 |
| 6,477,161 B1 | * | 11/2002 | Hudson et al. | ............. 370/342 |

FOREIGN PATENT DOCUMENTS

| DE | 19713666 | 10/1998 |
| WO | WO99/40689 | 8/1999 |

OTHER PUBLICATIONS

Search Report; Australin Patent Office via Singapore Patent Office, May 5, 2000.

* cited by examiner

Primary Examiner—Quochien B. Vuong
(74) Attorney, Agent, or Firm—ipsolon LLP

(57) ABSTRACT

A method for downlink capacity enhancement in a wireless communications system that has a base station with antenna array and terminals that are physically remote from the base station comprises the steps of receiving at the base station antenna array combinations of arriving signals from the plurality of remote terminals, estimating an uplink channel covariance matrix (UCCM) for each of the terminals from the combinations of arriving signals, constructing from each UCCM a downlink channel covariance matrix (DCCM), calculating from the DCCM a downlink weight vector for each of the terminals, transmitting a set of information signals from the base station antenna array according to the downlink weight vectors.

37 Claims, 17 Drawing Sheets

DOWNLINK BEAMFORMING METHOD

BACKGROUND OF THE INVENTION

The present invention relates in general to wireless communication systems and, more particularly, to using antenna array and signal processing techniques to increase downlink capacity and performance of wireless communication systems.

The next generation of wireless mobile communication systems will be required to provide a variety of services including digital voice, video and data in different transmission modes. These services will require higher data rates and higher received signal power levels, thus creating increased interference between users. In order to obtain high system capacity, the interference levels have to be reduced dramatically. Spatial division multiple access (SDMA), by which a plurality of antenna elements are equipped at the base station in order to receive and transmit data information from and to the desired user by using spatial diversities, has been proposed as an effective technique to achieve this.

The main operations in SDMA include uplink (from mobile station to base station) beamforming and downlink (from base station to mobile station) beamforming. Uplink beamforming consists of uplink beamforming weight generation and uplink signal demultiplexing. Downlink beamforming includes downlink beamforming weight generation and downlink signal multiplexing. Theoretically, in both links, the associated channel responses are of critical importance in order to generate corresponding beamforming weights.

Usually the antenna array is equipped at base station, not at mobile terminals due to size limitation. Uplink beamforming is easy for implementation since uplink channel responses (UCRs) can be directly measured. Therefore much attention has been paid to uplink capacity enhancement. However, it is also desirable to improve downlink capacity in order to improve the whole system capacity. Moreover, downlink capacity is even more important for the next generation mobile communication systems in which wireless internet, video-on-demand and multimedia services are to be required.

In wireless communications, two duplex modes can be used: time-division-duplex (TDD) and frequency-division-duplex (FDD). For TDD mode, uplink and downlink channel responses are equal if the dwelling time is short enough. Thus UCRs can be used as downlink channel responses (DCRs) in determining downlink beamforming weights. This approach, however, requires accurate synchronization between uplink and downlink time slots, otherwise, interference between uplink and downlink signals can be seriously large. For FDD mode, since uplink and downlink employ different carrier frequencies, uplink and downlink signals will not interfere with each other. Therefore, FDD duplex mode is adopt in most current wireless communication systems, and most probably will be used in the next generation systems.

In FDD systems, UCRs are different from DCRs since the RF propagation environment differs at the uplink and downlink carrier frequencies. Hence, using antenna array at the base station to improve downlink performance is usually a more difficult problem than the associated uplink one due to lack of direct measurement of downlink channel responses (DCRs). In U.S. Pat. No. 5,472,647, D. Gerlach and A. Paulraj proposed one conceptually simple method, called probing-feedback approach, to estimate DCRs. In this approach, probing signals are first sent to the mobile users from base station in order to measure the instantaneous downlink channel vectors (IDCVs), then the IDCVs are feedback to the base station to generate downlink beamforming weights using certain criterion. This approach, however, is only applicable in environment which varys very slow in time. In another U.S. Pat. No. 5,634,199, D. Gerlach and A. Paulraj proposed to feedback the stable downlink channel vectors (SDCVs) in order to reduce the feedback rate. Both methods seem to be not advisable since they require complete redesign of uplink and downlink protocols and signaling. Moreover, these methods may greatly reduce the transmission and spectrum efficiency.

Another kind of approach for estimating DCRs is based upon direction-of-arrival (DOA) information embedded in received uplink signals. In fact, since uplink and downlink signals travel through reflections and deflections due to same scatters surrounding the mobile and the base station, the DOAs of the uplink signals might be the only constant parameters which can be used for downlink beamforming.

DOA-based approaches employ the received uplink signals to compute the desired user's DOAs first, then DCRs are estimated by constructing downlink steering vectors for given DOAs. In International Patent Application Publication No. WO 97/45968, "Method of and apparatus for interference rejection combining and downlink beamforming in a cellular radiocommunications system", (12/97), Forssen et al proposed to compute the probability function with respect to different DOAs at which the desired signal may come from, and to choose the angle of incidence associated with the particular mobile station as the DOA value which maximizes the probability function. This technique, however, suffers from heavy computational burden in computing the probability function and searching the maximum point. In another International Patent Application Publication No. WO 96/22662, "Spectrally efficient high capacity wireless communication systems", (7/96), Barratt et al use subspace-based techniques (e.g., MUSIC and ESPRIT) to obtain high-resolution DOA estimates from the covariance matrix of the antenna outputs. It is well known that subspace-based algorithms require very complicated computations since they are involved in the computation of matrix inversion or singular value decomposition of complex matrices, and one or even more multidimensional nonlinear optimizations. On the other hand, accurate DOA estimates are not available in multipath cases since the number of multipath DOAs are usually greater than the number of antenna elements. This may limit the applicability of the DOA-based approaches for estimating DCRs.

In fact, from U.S. Pat. No. 5,634,199, it is the downlink channel covariance matrices (DCCMS) that determine the downlink beamforming weights. Similar conclusions were drawn and exploited by C. Farsakh and J. A. Nossek in paper, "Spatial covariance based downlink beamforming in an SDMA mobile radio system", *IEEE Trans. Comms.*, vol.46, No.11, 1998, pp.1497–1506. However, besides probing-feedback approach, the above two literatures failed to provide any efficient technique to compute DCCMs for FDD systems. Although in paper, "Downlink beamforming for spatially distributed sources in cellular mobile communications", *Signal Processing,* Vol.65, 1998, 181–197, Goldberg and Fonollosa proposed a method for estimating DCCMs. This technique, however, also suffers from heavy computational burden and there is room to further simplify the computation of DCCM so that it is easier for practical implementation. Yet, the approach proposed by Goldberg and Fonollosa cannot be applied to the cases in which receive and transmit antenna structures are different from each other.

As such, the first objective of the present invention is to develop a computationally efficient technique for generating DCCMs and SDCVs for FDD systems.

Once DCCMs or SDCVs are obtained, the work left is to design downlink beamforming weights using DCCMs or SDCVs. Traditional approach is to use SDCVs as the downlink weight vectors. This approach, called maximal ratio combining (MRC) approach, is equivalent to keeping the main beam of the downlink beam pattern toward the intended user. Since uplink usually employs minimum mean-square-error (MMSE) beamforming scheme, which is much better than MRC method, the traditional approach is not able to provide enough capacity to match its uplink counterpart. Another approach is proposed by F. Rashid-Farroki et al in paper, "Transmit beamforming and power control for cellular wireless systems," *IEEE Journal of Selected Areas in Communications,* vol.16, No.8, October 1998, pp. 1437–1449. This approach generates downlink beamforming weights using joint uplink beamforming and power control technique in which total transmitted power is to be minimized. This approach, however, does not consider data rate information, and more seriously, no efficient technique is suggested to jointly solve FDD and weight generation problem.

The next generation systems will be required to provide wireless internet, video-on-demand and multimedia services, thus users sharing the same channel may request higher data rates and higher received signal powers. If each user's main beam is simply directed to the desired user without considering the interference polluted to the other users, the quality of the low rate user spatially closed to stronger users may be so poor that even the minimum quality requirement cannot be satisfied. Thus how to design downlink beamforming weights such that maximum number of users with different data rate services can be supported within the same channel and same cell or sector while keeping satisfactory communication quality becomes the second objective of the present invention.

As mentioned earlier, in SDMA wireless communications, the main operations include uplink weight generation and downlink weight generation. Since uplink beamforming weights are useful information at hand, the third objective of the present invention is to develop methods for generating downlink beamforming weights by direct modifying uplink ones.

SUMMARY OF THE INVENTION

The present invention comprises a wireless communication system which integrates base station antenna array and signal processing techniques to improve downlink performance and capacity of wireless communications.

According to the present invention, an apparatus for communicating with a plurality of wireless users is provided which consists of uplink receive antenna array, uplink weight generator and uplink spatial demultiplexing and downlink weight generator, downlink spatial multiplexing and downlink transmit antenna array. Downlink beamforming weights can be derived from uplink channel covariance matrices (UCCMs), or uplink channel responses (UCRs), or uplink beamforming weights. Thus no feedback or intermediate step for estimating DOAs is required. Also, downlink transmit antenna array can be same as or different from uplink receive antenna array.

According to one aspect of the present invention, uplink receive antenna array acquires a plurality of combinations of signals transmitted from the mobile users, from which UCRs or UCCMs are estimated. Downlink channel covariance matrices (DCCMs) or downlink channel responses (DCRs) can then be derived from UCCM or UCRs together with certain frequency calibration processing.

Advantageously, DCCMs can be estimated from UCCMs via peak constraint method. Peak constraint method generates DCCM by keeping same peak positions of main beams for the beam patterns generated from the eigenvectors of UCCM and DCCM. This method links columnized DCCM vector with columnized UCCM vector through a linear multiplication with a frequency calibration (FC) matrix, which is only dependent on uplink and downlink carrier frequencies, receive and transmit antenna array structures of the system, and can be computed and stored in advance. Thus, peak constraint method is a simple while efficient technique for overcoming FDD problem.

Conveniently, SDCVs can be estimated from UCRs using peak constraint or null constraint methods. For peak constraint method, the principal eigenvector of the estimated DCCM is used as SDCV. For null constraint, SUCV is first estimated by computing the principal eigenvector of the UCCM, which is obtained from IUCVs via time-average approach, then SDCV is generated by keeping same null positions for the beam patterns generated from both SUCV and SDCV.

According to one aspect of the present invention, downlink beamforming weights can be generated from DCCMs or SDCVs using different approaches, such as iterative virtual power weighted (IVPW) approach, virtual power weighted (VPW) approach or spatial distribution weighted (SDW) approach. Downlink data rate information is exploited in designing downlink beamforming weights in order to maximize the system capacity.

According to one aspect of the present invention, downlink beamforming weights can be generated by direct modifying uplink beamforming weights.

Preferably, downlink beamforming weights can be implemented by using normal uplink beamforming weights together with null constraint method. The method is simple for implementation in terms of hardware and software complexities since uplink beamforming weights are already at hand.

Advantageously, downlink beamforming can be implemented by using leaky uplink beamforming weights together with certain frequency calibration processing, such as peak constraint transform. This method provides another choice for implementing downlink beamforming since in some cases leaky uplink beamforming scheme is already used in order to keep the uplink weight from converging to pathological solutions.

The basic properties and benefits of the present invention are summarized as follows:

1. The present invention provides a high flexibility in the sense that different kind of uplink information can be used, such as uplink channel covariance matrices, uplink channel responses and uplink beamforming weights.
2. The present invention is simple to implement. It does not require downlink channel feedback, thus eliminating the need for modifying uplink and downlink protocols, and not require demanding DOA estimation and its association.
3. The main concern complicating FDD system is the lack of downlink channel responses. The present invention provides two methods for solving this problem: peak constraint method and null constraint method.
4. The present invention takes care of possibly different receive and transmit antenna array structures, no matter if the systems are TDD or FDD.
5. The present invention provides different methods for generating downlink beamforming weights based upon different uplink information used. Downlink data rate information is also exploited in order to maximize system capacity. These methods can be applied in both TDD and FDD systems.

DETAILED DESCRIPTION

Figure 1:
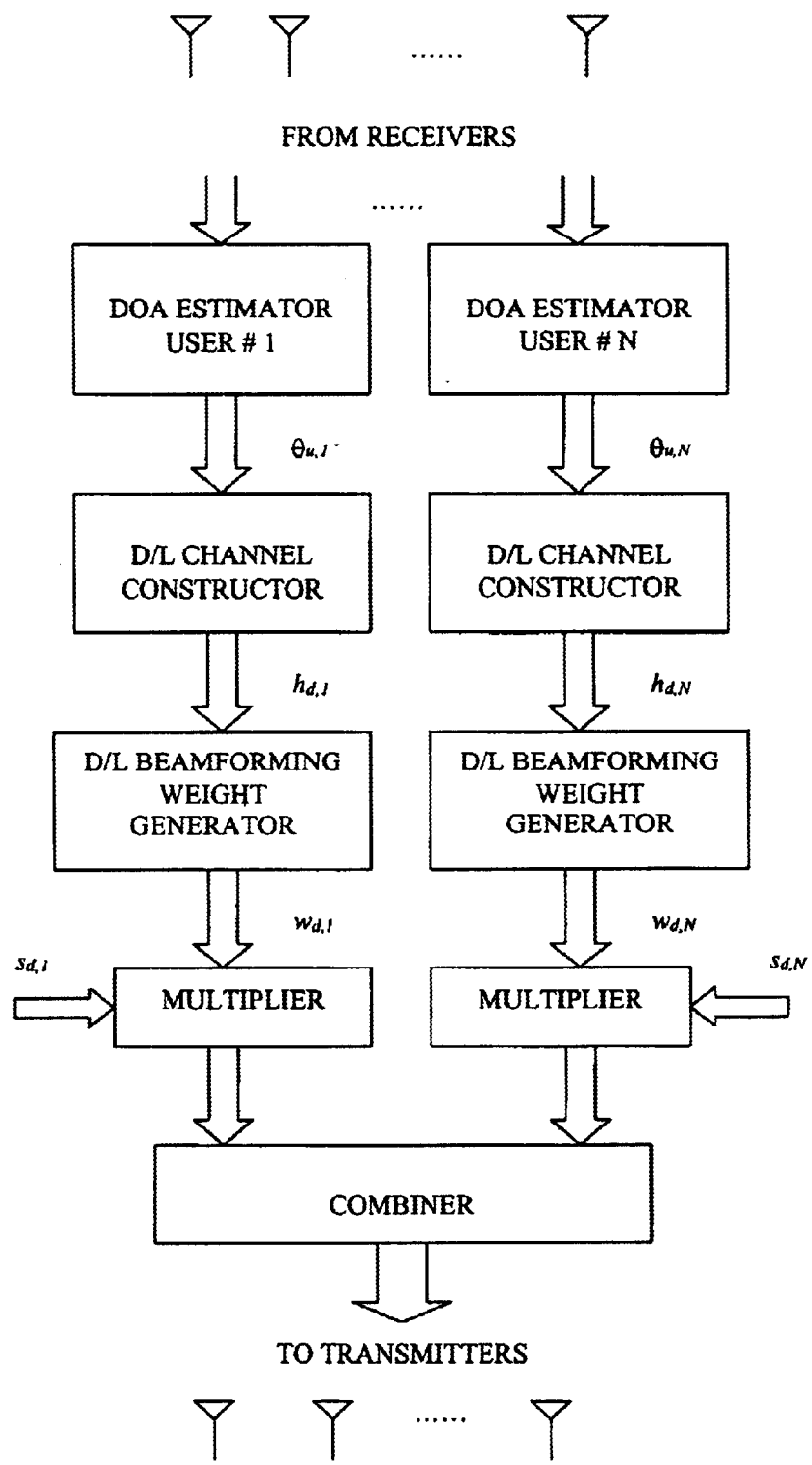
FIG. 1 is a graphic illustration of prior downlink beamforming scheme.

FIG. 1 shows the block diagram of downlink beamforming scheme according to prior art for improving downlink performance and capacity using base station antenna array. A plurality of mobile users share the same channels which can be a time slot for TDMA, a frequency band for FDMA or a set of spreading codes for CDMA. Using a plurality of transceivers, higher system capacity and better transmission performance can be achieved if proper uplink and downlink beamforming schemes are employed.

The prior art system first estimate each user's DOA values from the received uplink signals, then construct DCRs using downlink steering vectors for the estimated DOAs, finally set the DCRs as the downlink beamforming vectors. As discussed in the first section of this application, the prior art system is very complicated in the sense that all users' DOAs are to be estimated, also; this system cannot provide enough downlink capacity to match its uplink counterpart.

Figure 2:
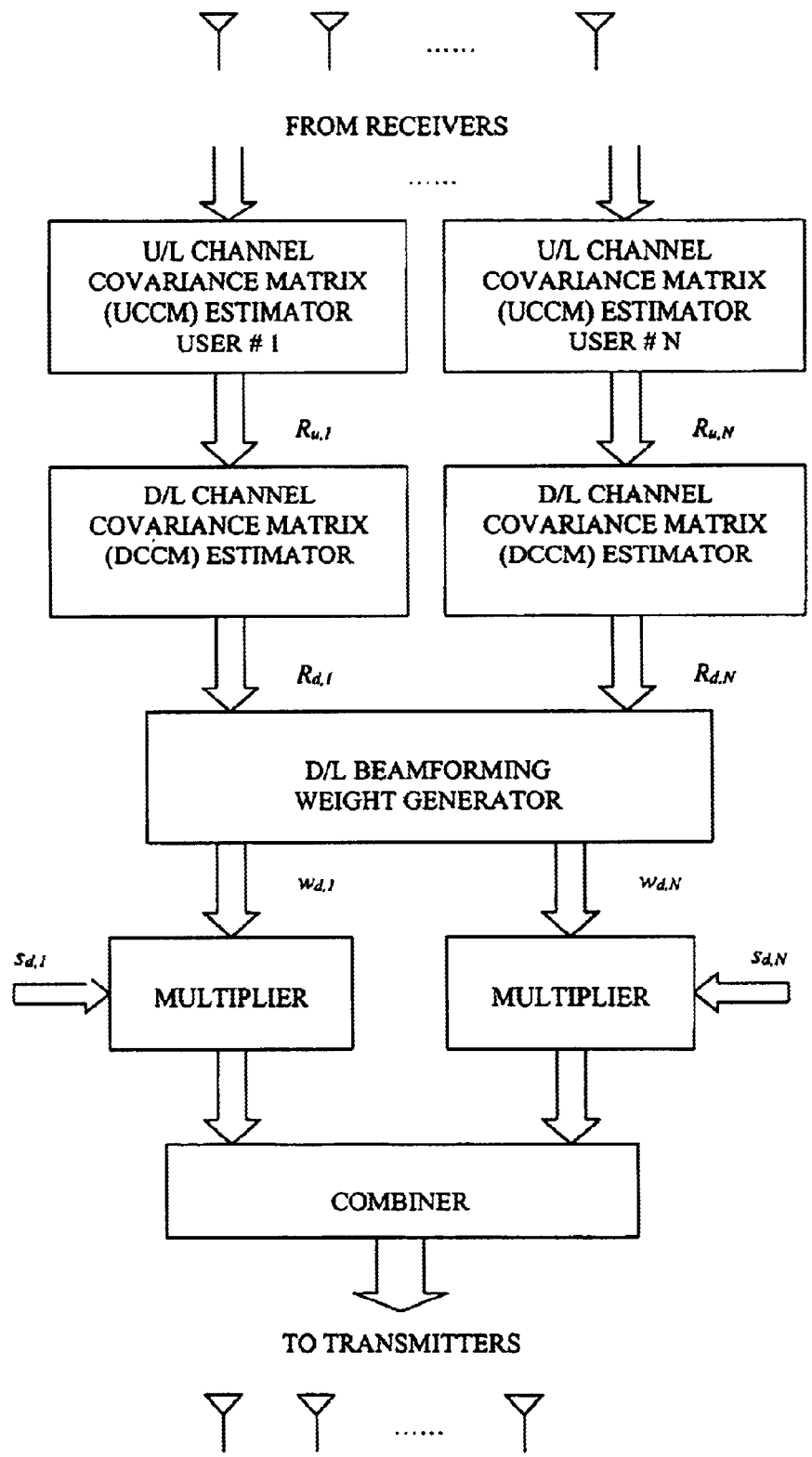
FIG. 2 is a graphic illustration of the downlink beamforming scheme using uplink channel covariance matrix (UCCM) estimates in accordance with the embodiment 1 of the present invention.

FIG. 2 illustrates how the system and method of embodiment 1 of the present invention can overcome this problem. The received uplink signals are first used to estimate uplink channel covariance matrix (UCCM). UCCMs are then exploited to estimate downlink channel covariance matrix (DCCM), from which downlink beamforming weights are generated by inputting downlink data rate information. Signals to be transmitted to mobile stations (MS) are finally weighted and combined for transmission through a plurality of transmitters. Therefore downlink beamforming weights can be generated from the received uplink signals directly, and no feedback or intermediate step for estimating DOAs is required.

UCCM can be estimated from received uplink signals directly, or from instantaneous uplink channel vector (IUCV) estimates derived using either pilot symbol assisted techniques or blink estimation techniques. For pilot symbol assisted approaches, both pilot symbols and decision-directed symbols can be used to improve estimation and tracking accuracy. For blind estimation techniques, constant modulus properties or finite alpha-beta properties of the modulated signals are exploited. Although there are some phase ambiguities within blind techniques, this will not affect DCCM estimates since they are blind to this ambiguity.

If multi-delay paths exist, each path's IUCVs can be estimated separately. This approach is applicable for wideband CDMA wireless communication systems.

Figure 3:
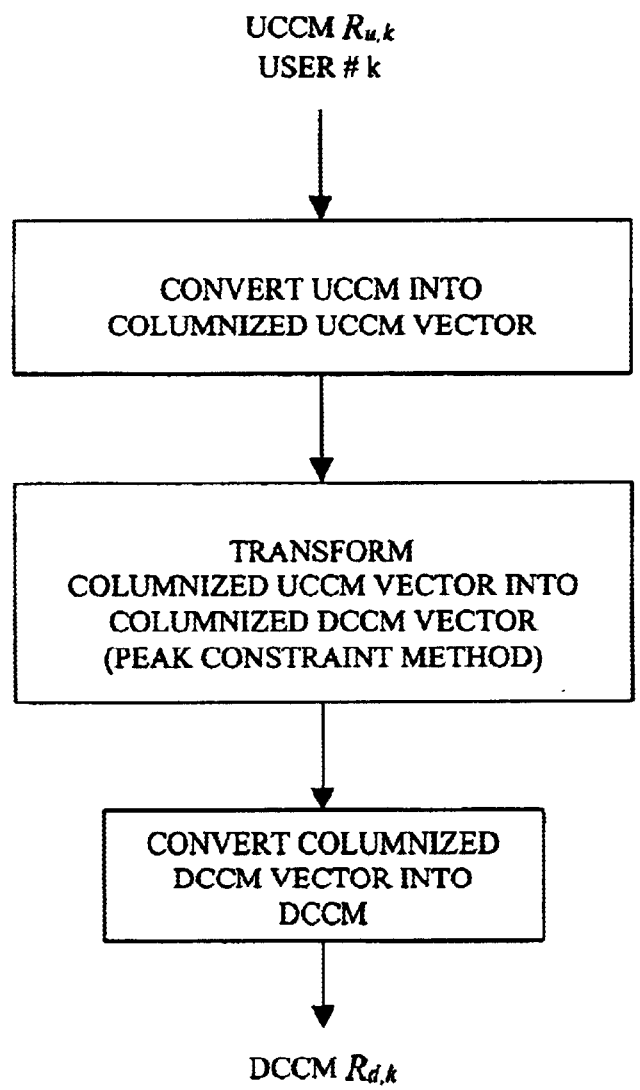
FIG. 3 is a block diagram of DCCM estimator in accordance with the present invention.

FIG. 3 shows the block diagram of DCCM estimator, which is one of the key parts of the present invention. According to FIG. 3, DCCM is estimated by using UCCM through certain frequency calibration processing. Specifically, UCCM is first converted into a columnized UCCM vector, followed by an uplink-to-downlink transformer, followed by DCCM constructor. The theoretical basis of this method is given below. Here we consider a specific user.

Uplink channel response is $$h_u(t) = \sum_{l=1}^{L} g(\theta_l)\alpha_{u,l}(t)a_u(\theta_l),$$

where $g(\theta)$ and $\alpha_{u,l}(t)$ are the antenna gain and uplink complex fading path strength respectively, $a_u(\theta_l)$ is the uplink steering vector at angle $\theta_l$.

For FDD system, according to reciprocal law, only the DOAs remain unchanged for uplink and downlink transmissions. Thus the downlink channel response for the same user is:

$$h_d(t) = \sum_{l=1}^{L} g(\theta_l)\alpha_{d,l}(t)a_u(\theta_l),$$

where $\alpha_{d,l}(t)$ is downlink complex fading path strength, $a_d(\theta_l)$ is the downlink steering vector at angle $\theta_l$.

$$UCCM: R_u = \sum_{l=1}^{L} g^2(\theta_l)E[|\alpha_u(t)|^2]a_u(\theta_l)a_u^H(\theta_l)$$

$$DCCM: R_d = \sum_{l=1}^{L} g^2(\theta_l)E[|\alpha_{d,1}(t)|^2]a_d(\theta_l)a_d^H(\theta_l)$$

By considering $E[|\alpha_{u,l}(t)|^2]=E[|\alpha_{d,l}(t)|^2]=|\alpha_l|^2$, both uplink and downlink have the same spatial density function $\sigma(\theta)=g^2(\theta)|\alpha_l|^2$, which can be expressed in terms of Fourier series expansion over the possible DOA interval.

$$\sigma(\theta) = \sum_{k}^{K} c(k) e^{jkS\theta},$$

where S is the number of sectors per cell.

$$R_u = \sum_{k=-K}^{K} c(k) Q_u^{(k)}, \text{ with}$$

$$Q_u^{(k)} = \int_{-\pi/S}^{\pi/S} a_u(\theta) a_u^H(\theta) e^{-jkS\theta} d\theta, \text{ or}$$

$$Q_u c = r_u,$$

where $c=[c(-K), \Lambda\ c(k)]^T$, $Q_u=[q_u^{(-K)}, \Lambda\ q_u^{(k)}]$ with $q_n^{(k)}$ and $r_u$ being the columnized vectors of $Q_u^{(k)}$ and $R_u$.

$$R_d = \sum_{k=-K}^{K} c(k) Q_d^{(k)}, \text{ with}$$

$$Q_d^{(k)} = \int_{-\pi/S}^{\pi/S} a_d(\theta) a_d^H(\theta) e^{-jkS\theta} d\theta, \text{ or}$$

$$Q_d c = r_d,$$

where $Q_d=[q_d^{(-K)}, \Lambda\ q_d^{(k)}]$ with $q_d^{(k)}$ and $r_d$ being the columnized vectors of $Q_d^{(k)}$ and $R_d$.

Thus linear relationship between elements of $R_d$ and $R_u$ is established: $r_d = A r_u$, where $A = Q_d (Q_u^H Q_u)^{-1} Q_u^H$ is called frequency calibration (FC) matrix.

The FC matrix A is only dependent on uplink and downlink carrier frequencies, transmit and receive array structures and cell sectorization, thus it can be computed and stored in advance and used directly during on-line processing.

Physically, if the angular spread is small, the above technique maintains the same peak position for both uplink and downlink main beams generated from the principal eigenvectors of UCCM and DCCM, even though the system is a FDD system, thus is called peak constraint (PC) transform. This technique does not limit itself to the cases in which transmit antenna array structure is the same as receive antenna array structures. Here, the array structure means array geometry, antenna spacing and number of antenna elements.

Three algorithms for computing columnized DCCM vector can be used.

Algorithm 1 is applicable for any geometry of antenna array case, in which the FC matrix is a $n^2 \times m^2$ (possible complex) matrix, m and n are the numbers of receive and transmit antenna elements.

Algorithm 1: $r_d = A r_u$.

$r_d$: $n^2 \times 1$, $r_u$: $m^2 \times 1$, A: $n^2 \times m^2$.

Algorithm 2 is applicable for uniform linear array (ULA) in which the uplink and downlink channel covariance matrices are Hermitian and Toeplitz, thus only the first column and first row elements of UCCM $R_u$ are used to construct those of DCCM $R_d$. Therefore, the associated FC matrix is a $(2n-1) \times (2m-1)$ real matrix.

Algorithm 2: $p_d = B p_u$.

$p_d$: $(2n-1) \times 1$, $p_u$: $(2m-1) \times 1$, B: $(2n-1) \times (2m-1)$.

Algorithm 3 is also applicable for uniform linear array (ULA) in which the uplink and downlink channel covariance matrices are Hermitian and Toeplitz. Here, one n×m real FC matrix and one (n−1)×(m−1) real FC matrix are involved.

Algorithm 3: $q_{d,r} = C_r q_{u,r}$, $q_{d,i} = C_i q_{u,i}$ $q_{d,r}$: n×1, $q_{u,r}$: m×1, $C_r$: n×m, $q_{d,i}$: (n−1)×1, $q_{u,i}$: (m−1)×1, $C_i$: (n−1)×(m−1)

As an example, for 6-elements ULA, 3 sectors/cell, and $f_u=1.8$ GHz and $f_d=2.0$ GHz, the FC matrices are given below.

$$C_r = \begin{bmatrix} 1.0000 & 0 & 0 & 0 & 0 & 0 \\ -0.1031 & 1.0415 & 0.0778 & -0.0221 & 0.0081 & -0.0030 \\ 0.1136 & -0.2734 & 1.0100 & 0.1857 & -0.0474 & 0.0156 \\ -0.1371 & 0.2890 & -0.3613 & 0.9663 & 0.2890 & -0.0595 \\ 0.1950 & -0.3938 & 0.4112 & -0.4760 & 0.9377 & 0.3734 \\ -0.4983 & 0.9853 & -0.9544 & -0.9143 & -0.9056 & 1.0823 \end{bmatrix}$$

$$C_i = \begin{bmatrix} 0.9370 & 0.1406 & -0.0604 & 0.0299 & -0.0150 \\ -0.1223 & 0.9076 & 0.2526 & -0.0872 & 0.0384 \\ 0.0852 & -0.2139 & 0.8659 & 0.3507 & -0.0957 \\ -0.0851 & 0.1785 & -0.3126 & 0.8349 & 0.4351 \\ 0.1608 & -0.3126 & 0.4521 & -0.6091 & 0.9006 \end{bmatrix}$$

The computational complexities of the above three algorithms for estimating DCCM are different. Specifically, for m=n=6, the complexity of Algorithm 3 is 25% of that of Algorithm 2, and 2.5% of that of Algorithm 1.

According to the present invention, TDD is a special case of FDD, in which uplink and downlink carrier frequencies are the same. However, the peak constraint transform can still take care of the porosity different receive and transmit antenna array structures.

Figure 4:
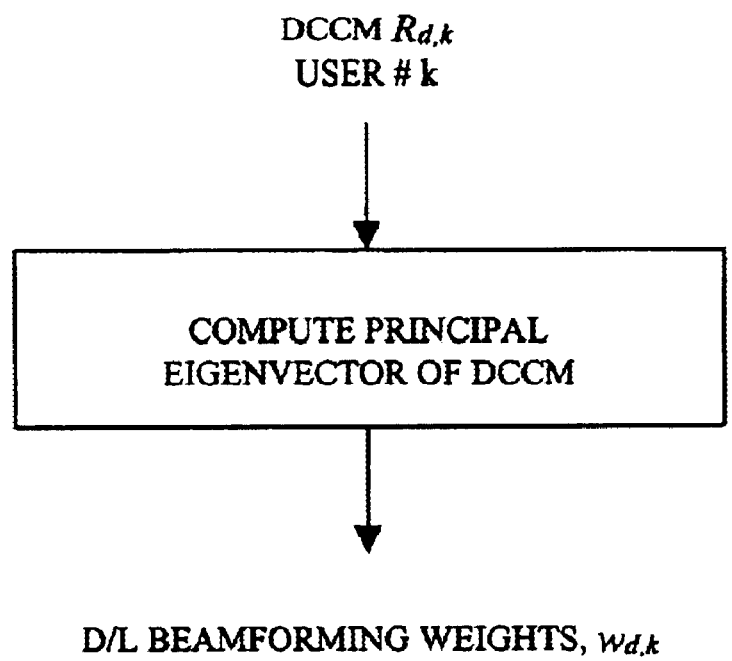
FIG. 4 shows first embodiment of downlink beamforming generator using DCCMs.

FIG. 4 shows first embodiment of downlink beamforming weight generator using DCCM. According to FIG. 4, the principal eigenvector of DCCM can be used as the downlink beamforming weight vector. The functionality of the embodiment is the same as the prior art shown in FIG. 1, i.e., keeping the main beam of the downlink beam pattern toward to the desired user. However, the new embodiment is much simpler than the prior art shown in FIG. 1 as it is not involved with DOA estimation.

Figure 5:
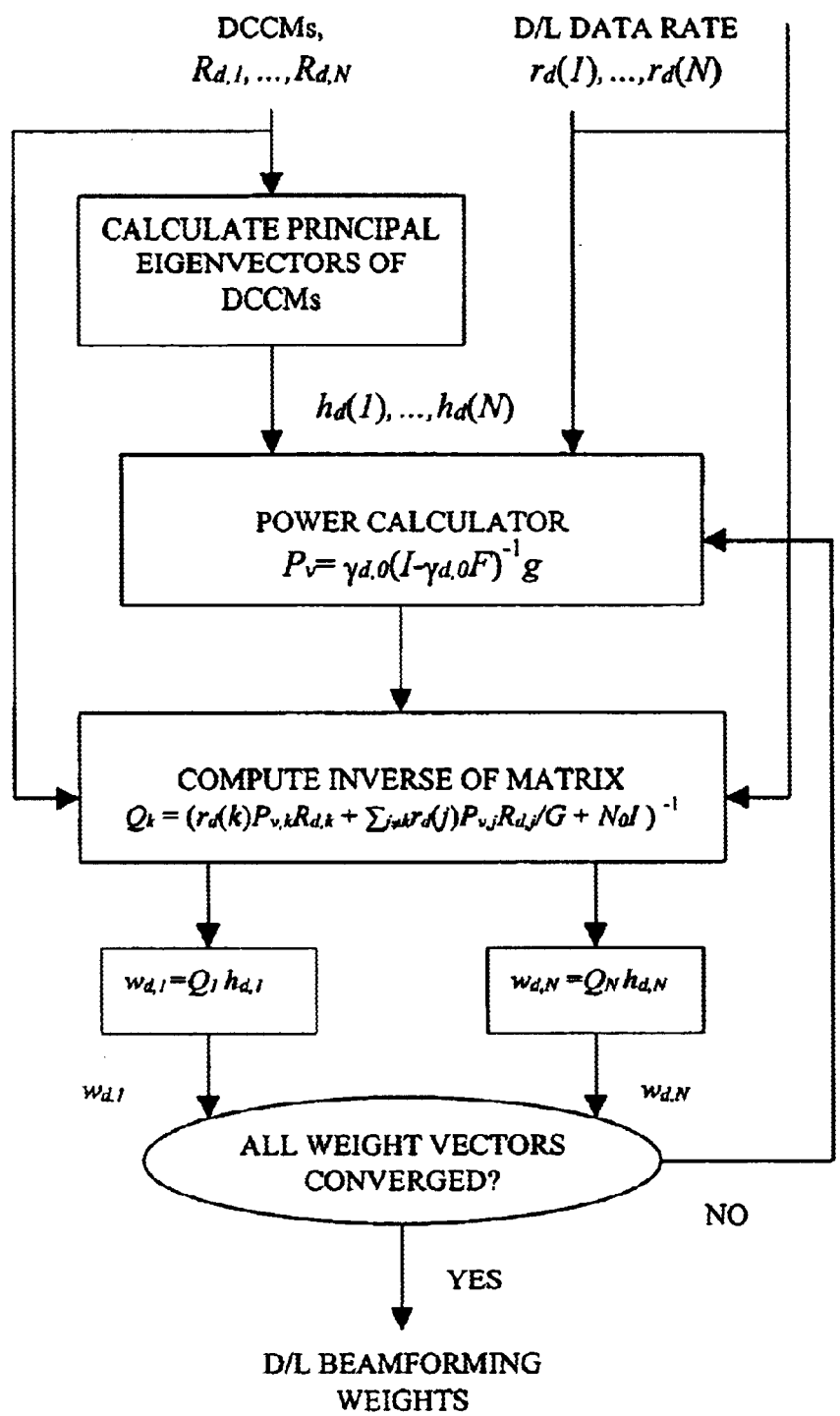
FIG. 5 shows second embodiment of downlink beamforming generator using DCCMs.

FIG. 5 illustrates second embodiment of downlink beamforming weight generator using DCCM, in which downlink data rate information is used as well. According to the present invention, in order further to improve the performance of systems using base station antenna array, downlink data rate information can be taken into consideration in designing downlink beamforming weights. As an example, we will consider a DS-CDMA system with base station antenna array.

Suppose N mobile users share the same sector, and $h_{d,k}^{(l)}, l=1, K, L_k$ are the lth path channel responses from the base station antenna array to the kth user. We consider per-user-per-weight downlink beamforming scheme due to its robustness to path changing problem and simplicity for implementation, and let $w_{d,k}$ denote the beamforming weight vector for user k. It can be shown that the instantaneous SIR at the Rake combiner output is given by $SIR_{d,k} = \tilde{S}_k / \tilde{I}_k$, where $$\tilde{S}_k = \frac{P_{d,k} T}{N_0} \sum_{l=1}^{M} |w_{d,k}^H h_{d,k}^{(l)}|^2,$$

$$\tilde{I}_k = \frac{P_{d,k}T}{N_0} \frac{r_d(k)}{G} \left( \sum_{l=1}^{M} \sum_{l=1, j \neq l}^{L_k} \frac{|w_{d,k}^H h_{d,k}^{(l)}|^2 |w_{d,k}^H h_{d,k}^{(l)}|^2}{\sum_{l=1}^{M} |w_{d,k}^H h_{d,k}^{(l)}|^2} \right) +$$

$$\sum_{j=1, j \neq k}^{N} \frac{r_d(j)}{G} \frac{P_{d,j}T}{N_0} \left( \sum_{l=1}^{L_k} |w_{d,j}^H h_{d,k}^{(l)}|^2 - \frac{\sum_{l=1}^{M} |w_{d,k}^H h_{d,k}^{(l)}|^2 |w_{d,j}^H h_{d,k}^{(l)}|^2}{\sum_{l=1}^{M} |w_{d,k}^H h_{d,k}^{(l)}|^2} \right) + 1$$

with G being the processing gain, $P_{d,k}T$ the average signal energy-per-bit of one code channel user k, $N_0$ the one-sided spectrum density of AWGN noise, and $r_d(k)$ the normalized data rate of user k.

For DS-CDMA systems, power control is needed in order to compensate near-far problem. Specifically, for SIR-based power control, we try to maintain $SIR_{d,k} = \gamma_0$, where $\gamma_0$ is the target SIR threshold, or $$(I - \gamma_0 F_d) p_d = g_d \quad (1)$$

where $$p_d = [P_{d,1}T, K, P_{d,N}T]^T,$$

$$g_d = \left[ \frac{\gamma_0 N_0}{\sum_{l=1}^{L_1} |w_{d,1}^H h_{d,1}^{(l)}|^2}, K, \frac{\gamma_0 N_0}{\sum_{l=1}^{L_N} |w_{d,N}^H h_{d,N}^{(l)}|^2} \right]^T,$$

and $F_d$=DFR with $$D = diag \left[ \frac{1}{\sum_{l=1}^{L_1} |w_{d,1}^H h_{d,1}^{(l)}|^2}, K, \frac{1}{\sum_{l=1}^{L_N} |w_{d,N}^H h_{d,N}^{(l)}|^2} \right], \quad (2)$$

$$R = diag[r_d(1), \ldots, r_d(N)],$$

$$[F]_{i,j} = \begin{cases} \frac{1}{G} \left( \sum_{l=1}^{L_i} |w_{d,j}^H h_{d,j}^{(l)}|^2 - \frac{\sum_{l=1}^{L_i} |w_{d,j}^H h_{d,j}^{(l)}|^4}{\sum_{l=1}^{M} |w_{d,i}^H h_{d,i}^{(l)}|^2} \right), & i = j \\ \frac{1}{G} \left( \sum_{l=1}^{L_i} |w_{d,j}^H h_{d,j}^{(l)}|^2 - \frac{\sum_{l=1}^{L_i} |w_{d,j}^H h_{d,j}^{(l)}|^2 |w_{d,i}^H h_{d,i}^{(l)}|^2}{\sum_{l=1}^{M} |w_{d,j}^H h_{d,i}^{(l)}|^2} \right), & i \neq j \end{cases}$$

Given downlink beamforming weights, if we do not consider power constraint, then $$\frac{1}{\rho(F_d)}$$

is actually the maximum achievable SIR threshold, where $\rho(F_d)$ is the spectral radius of $F_d$. The outage probability is defined as $$P_{out} = Pr\left( \frac{1}{\rho(F_d)} < \gamma_{d,0} \right),$$

where $\gamma_{d,0}$ is the target SIR threshold. Therefore, the objective of downlink beamforming is, for given $\gamma_{d,0}$, to choose a set of beamforming weights $w_{d,k}$'s, such that the outage probability is minimal, or maximum number of users can be supported within the same sector. As the outage probability is most probably affected by the cases whose $$\frac{1}{\rho(F_d)}$$

value is near $\gamma_{d,0}$. The objective is equivalent to finding a set of weights such that minimum total transmitted power is required in order for all users to achieve the SIR requirement, $\gamma_{d,0}$. This is, obviously, a difficult multi-variable optimization problem. Fortunately, this problem can be converted into an easily solved problem by making some approximations. Specifically, since the optimal weight vector, $w_{d,i}$, generates almost equal beam responses at the DOAs of all paths of user i, we have $$[\overline{F}]_{i,j} \approx \frac{L_i - 1}{GL_i} \sum_{l=1}^{L_i} |w_{d,j}^H h_{d,i}^{(l)}|^2, \quad \text{for } i \neq j. \quad (3)$$

In this case, specifically, define $F_u = D\overline{F}^T R$, then $\rho(F_d) \approx \rho(F_u)$ since both D and R are diagonal matrices. Note $F_u$ can be considered as a virtual uplink matrix, which is an uplink counterpart of $F_d$. Thus the solution to the above problem can be obtained using iterative virtual power weighted (IVPW) algorithm as shown in FIG. 5, or more simply, virtual power weighted (VPW) algorithm illustrated in FIG. 6, or spatial distribution weighted (SDW) algorithm shown in FIG. 7. Here, for simplicity, we use an equivalent-one-path channel vector (EOCV), $h_{d,k}$, to replace multi-delay paths of user k.

FIG. 5 shows IVPW algorithm for estimating downlink beamforming weights according to the present invention. It consists of the following iterative steps.

(1.1) Input downlink data rate information (DDRI), $r_d(k)$, for k=1,Λ,N.

(1.2) Choose initial weight vectors, say $w_{d,k} = h_{d,k}$, for k=1, ..., N;

(1.3) Determine virtual uplink power vector for given weight vectors:

$$p_v = \gamma_{d,0}(I - \gamma_{d,0}F)^{-1}g;$$

(1.4) For given power vector, derive weight vectors using maximum SINR criteria, for all users, for k=1, ..., N, $$\max \frac{P_{v,k} w_{d,k}^H R_{d,k} w_{d,k}}{w_{d,k}^H \left( \sum_{j \neq k}^{N} \frac{1}{G} R_{d,i} r_d(j) P_{v,j} + r_d(k) P_{v,k} R_{d,k} + N_0 I \right) w_{d,k}};$$

(1.5) Update (1.3) and (1.4) until power and weight vectors are converged. The converged weight vectors are used as downlink beamforming weight vectors.

Figure 6:
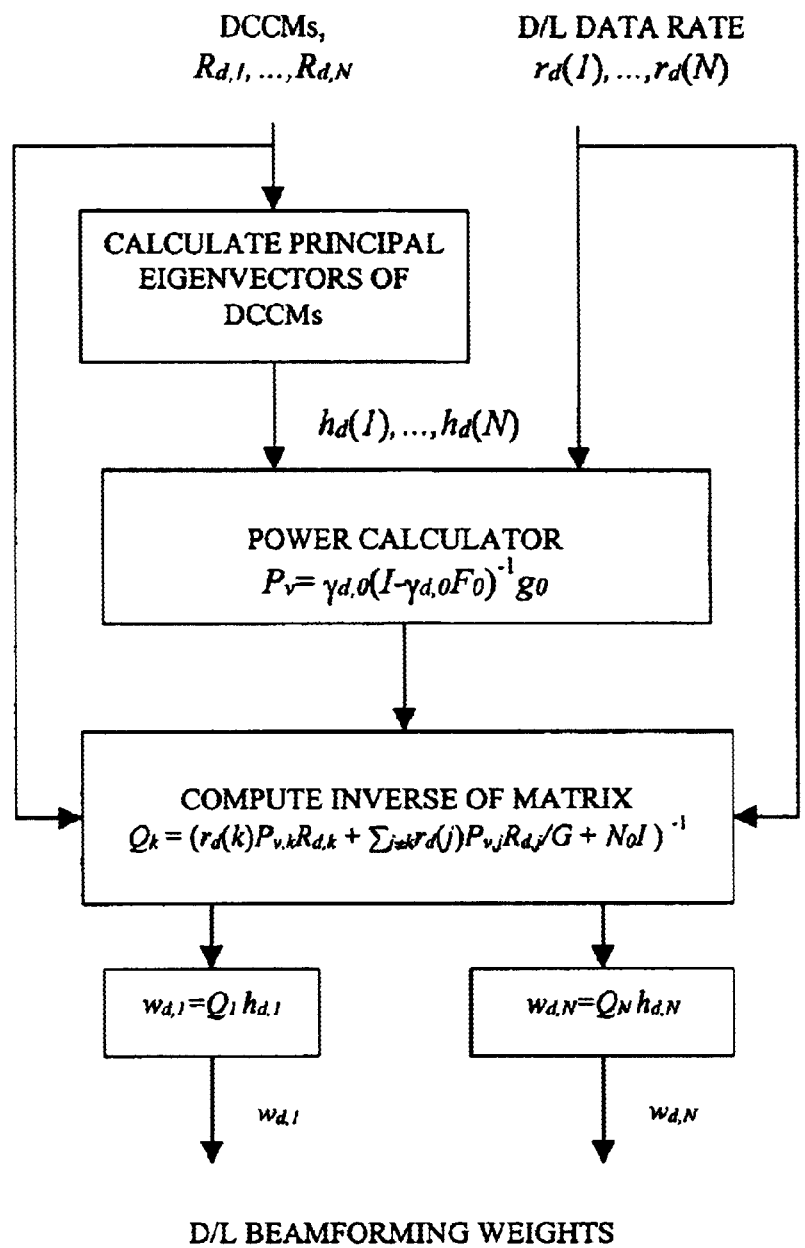
FIG. 6 shows third embodiment of downlink beamforming generator using DCCMs.

IVPW algorithm involves iterative updates. FIG. 6 shows third embodiment for generating downlink beamforming weight according to the present invention. This embodiment is called VPW algorithm, in which no iterative update process is required. According to FIG. 6, the embodiment consists of the following steps.

(2.1) Input downlink data rate information (DDRI), $r_d(k)$, for $k=1,\Lambda,N$.

(2.2) Choose initial weight vectors: $w_{d,k}=h_{d,k}$, for $k=1,\ldots,N$;

(2.3) Determine virtual uplink powervector: $\rho_v=\gamma_{d,0}(I-\gamma_{d,0}F_0)^{-1}g_0$;

(2.4) Derive weight vectors using maximum SINR criteria for all users, $$\max \frac{P_{v,k} w_{d,k}^H R_{d,k} w_{d,k}}{w_{d,k}^H \left( \sum_{j \neq k}^{N} \frac{1}{G} R_{d,j} r_d(j) P_{v,j} + r_d(k) P_{v,k} R_{d,k} + N_0 I \right) w_{d,k}};$$

(2.4) The above solution is set for downlink beamforming weight vector.

Figure 7:
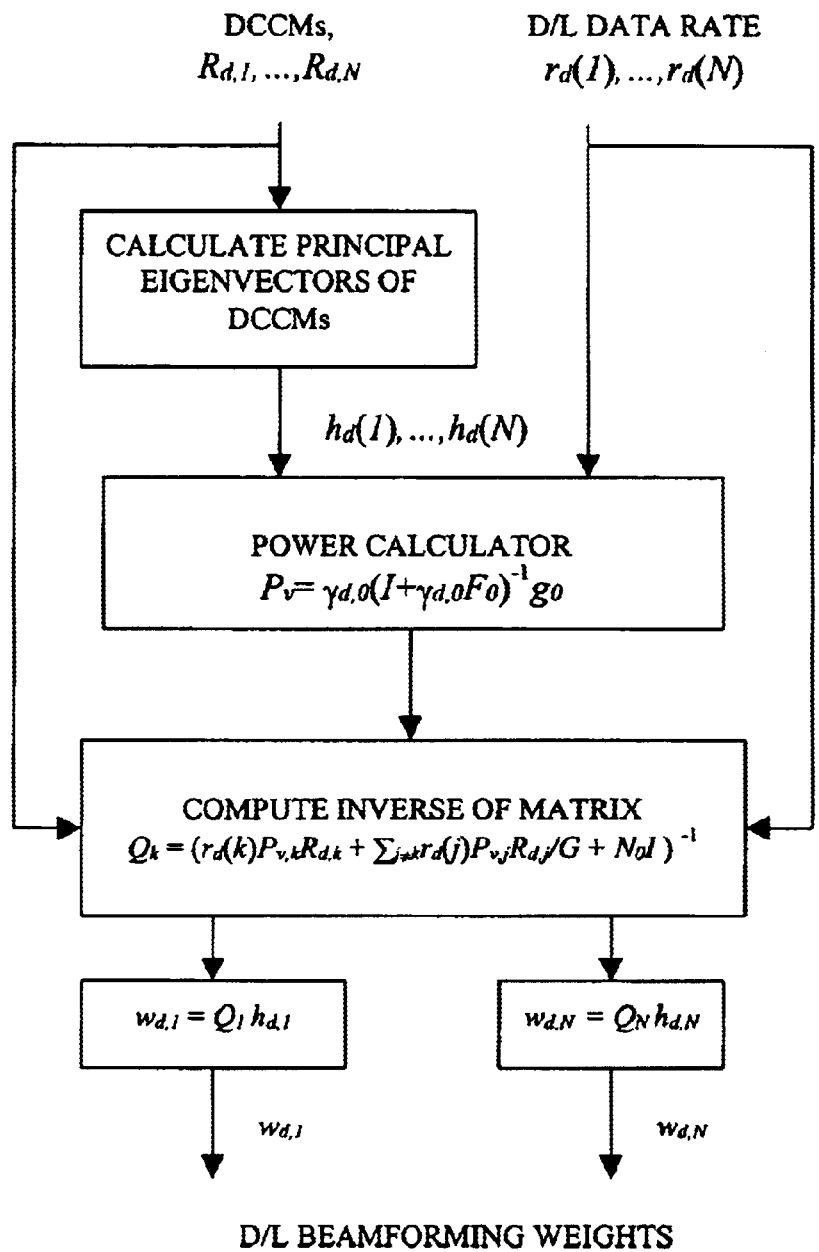
FIG. 7 shows fourth embodiment of downlink beamforming generator using DCCMs.

Further simplification is derived in the fourth embodiment of downlink beamforming weight generator, SDW algorithm, according to the present invention, which is shown in FIG. 7. According to FIG. 7, we may simplify the power vector computation by replacing matrix inverse with an approximation. Specifically, the new embodiment consists of the following step (3.1) Input downlink data rate information (DDRI), $r_d(k)$, for $k=1,\Lambda,N$.

(3.2) Choose initial weight vectors: $w_{d,k}=h_{d,k}$, for $k=1,\ldots,N$;

(3.3) Determine virtual uplink powervector: $p_v=\gamma_{d,0}(I+\gamma_{d,0}F_0)g_0$;

(3.4) Derive weight vectors using maximum SINR criteria, for all users, $$\max \frac{P_{v,k} w_{d,k}^H R_{d,k} w_{d,k}}{w_{d,k}^H \left( \sum_{j \neq k}^{N} \frac{1}{G} R_{d,j} r_d(j) P_{v,j} + r_d(k) P_{v,k} R_{d,k} + N_0 I \right) w_{d,k}};$$

(3.5) The above solution is set for downlink beamforming weight vector.

In FIG. 5–FIG. 7, although we don't have downlink channel information in determining virtual power vector, we replace it with stable downlink channel vector (SDCV) estimate, which is defined as the principal eigenvector of DCCM.

Figure 8:
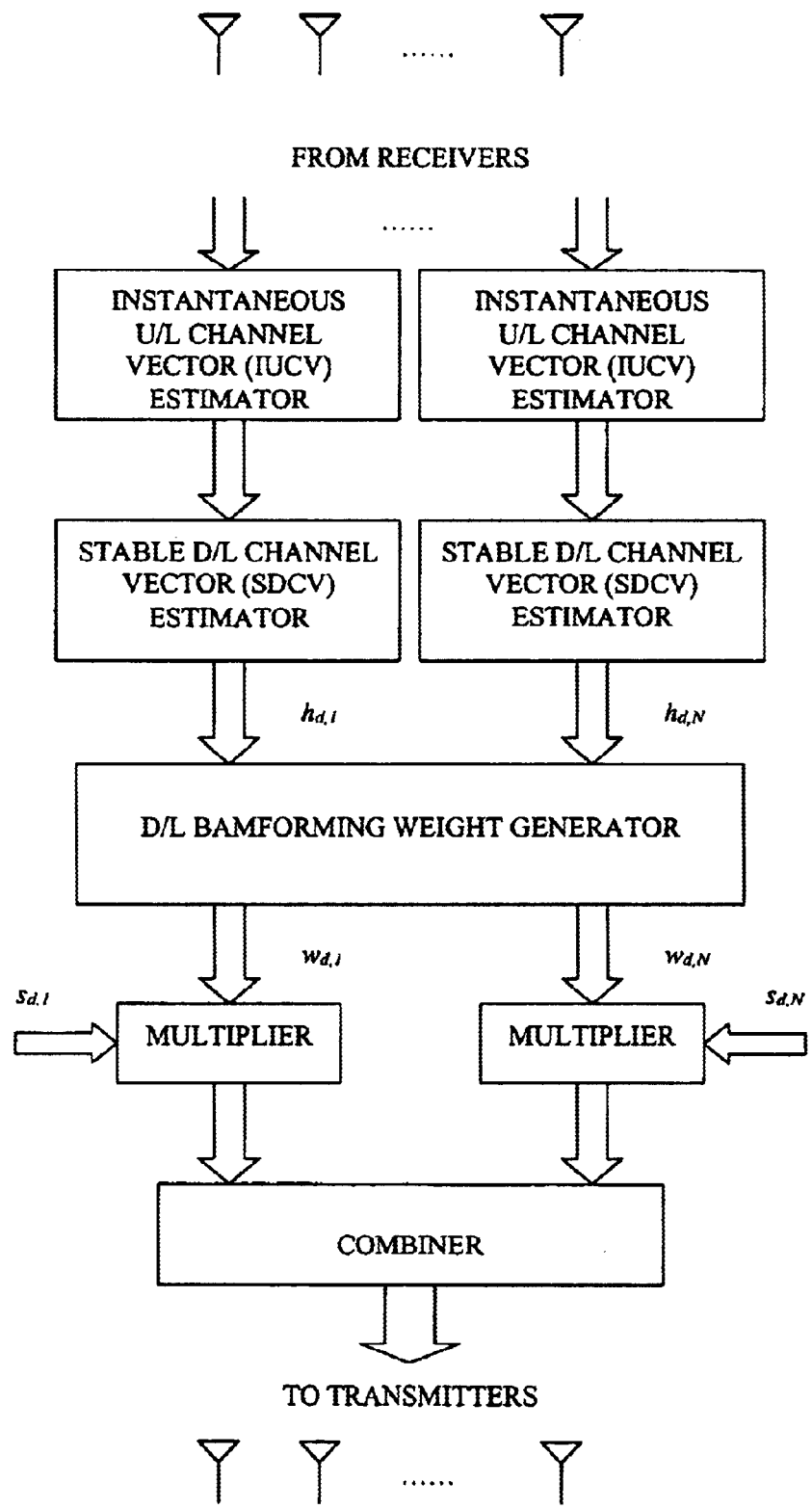
FIG. 8 is a graphic illustration of the downlink beamforming scheme using uplink channel responses (UCRs) in accordance with embodiment 2 of the present invention.

FIG. 8 illustrates the block diagram of downlink beamforming scheme using uplink channel estimates in accordance with embodiment 2 of the present invention. The received uplink signals are first used to estimate instantaneous uplink channel vectors (IUCVs), which are then passed to downlink channel estimator, followed by beamforming weight generator. Downlink data rate information is also added in generating downlink beamforming weights. Signals to be transmitted to mobile users are finally weighted by these weights and combined for transmission through a plurality of transmitters.

Figure 9:
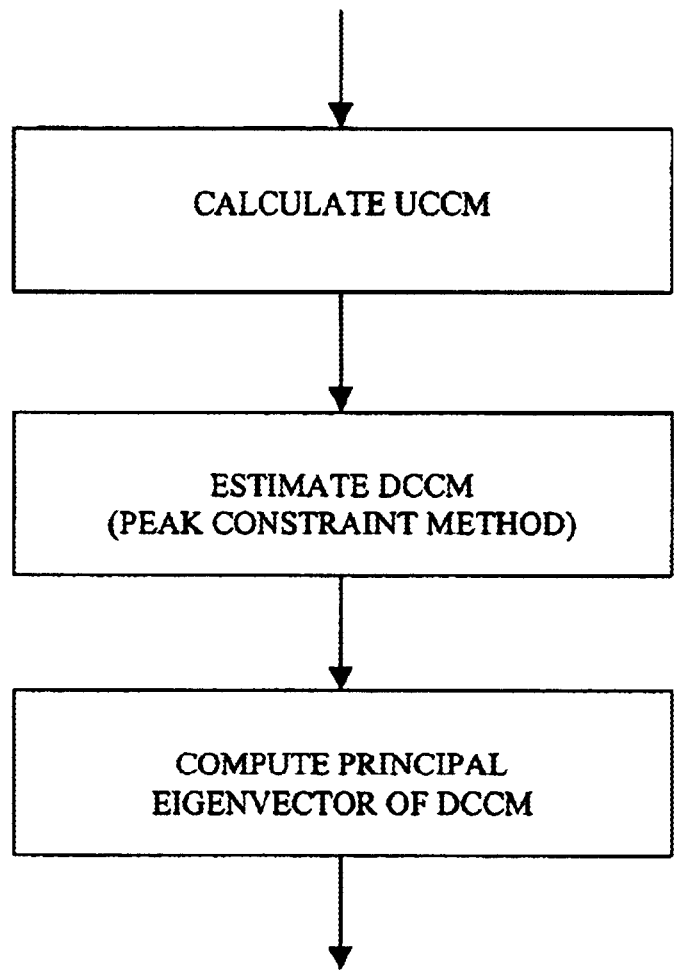
FIG. 9 shows one embodiment of stable downlink channel vector (SDCV) estimator.

FIG. 9 shows one embodiment of downlinks, channel estimator according to the present invention. IUCVs are first used to calculate UCCM via time average approach. DCCM is estimated using peak constraint method. The principal eigenvector is used as SDCV estimate.

Figure 10:
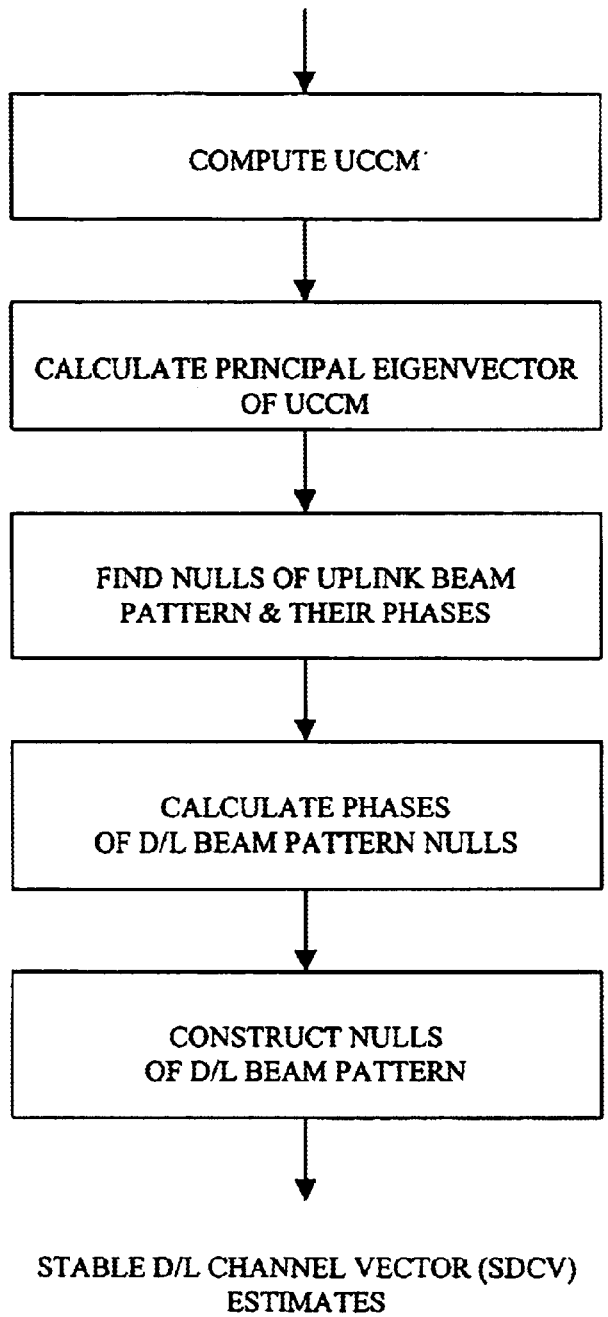
FIG. 10 shows another embodiment of SDCV estimator.
Figure 11:
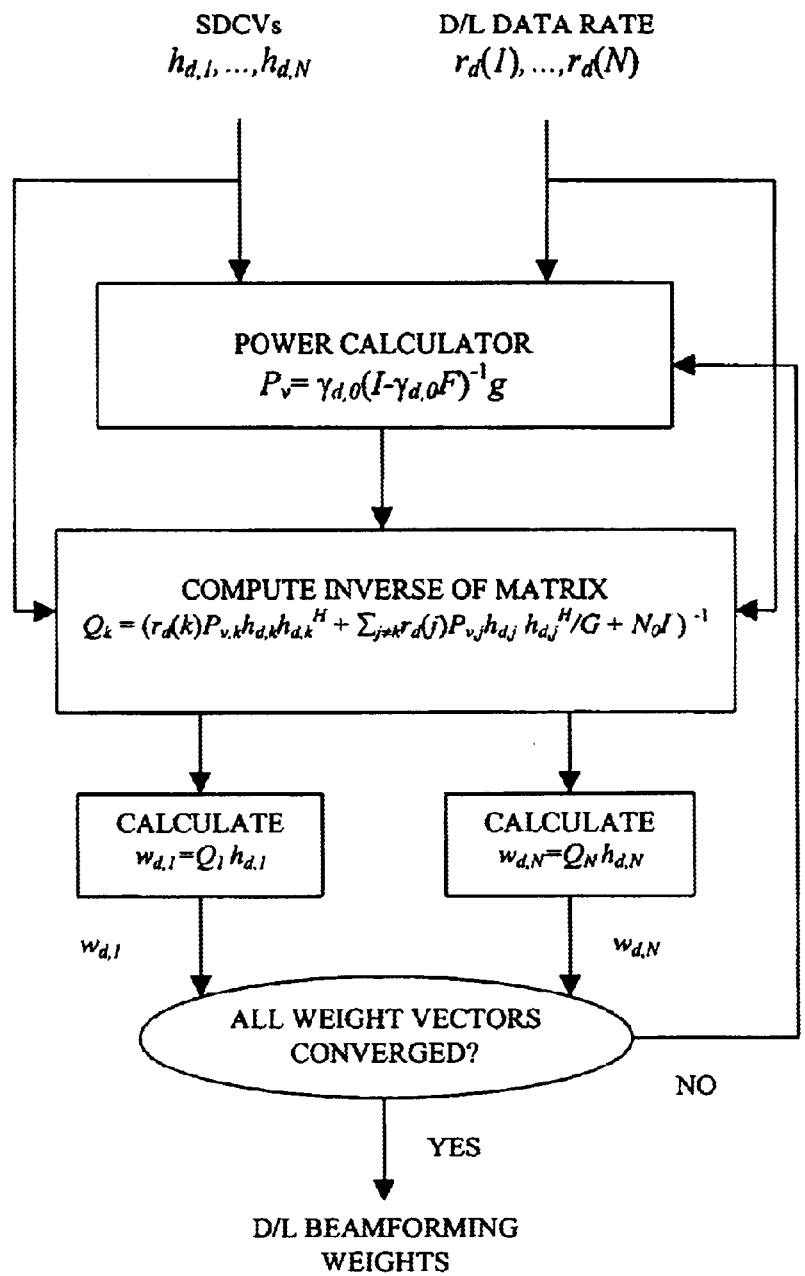
FIG. 11 shows first embodiment of downlink beamforming generator using SDCVs.
Figure 12:
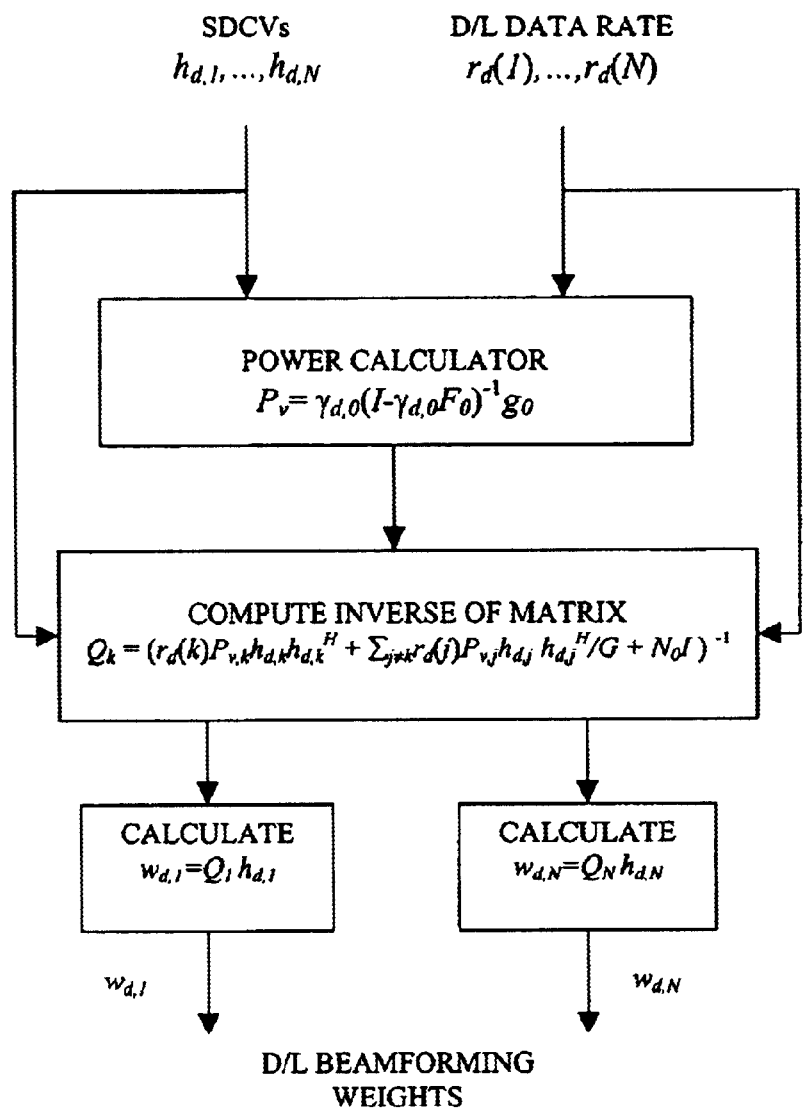
FIG. 12 shows second embodiment of downlink beamforming generator using SDCVs.
Figure 13:
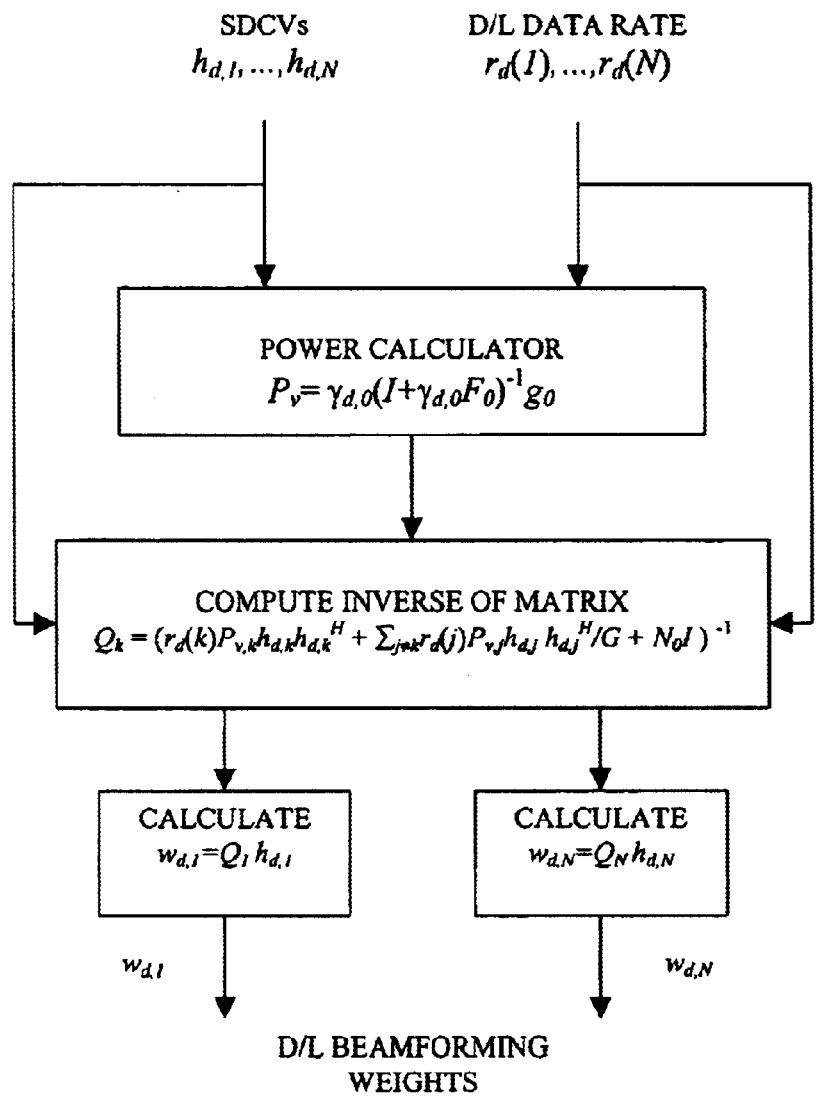
FIG. 13 shows third embodiment of downlink beamforming generator using SDCVs.

FIG. 10 illustrates another embodiment of downlink channel estimator according to the present invention. Different from peak constraint method, the main idea of this estimator is to keep same the null positions of beams generated from SUCVs and SDCVs. Thus we call this as null constraint method.

Specifically, null constraint method is described as follows.

(4.1) Use IUCVs to calculate UCCM;

(4.2) Choose principal eigenvector of UCCM as SUCV, $h_{u,k}$;

(4.3) Determine uplink beam nulls $Z_{u,k}^{(i)}$ from the polynomial formed from SUCV.

$$h_{u,k}^{(1)}(1-z_{u,k}^{(1)}z^{-1})\Lambda\left(1-z_{u,k}^{(M-1)}z^{-1}\right) = \sum_{i=1}^{M} h_{u,k}^{(t)} z^{t-1}.$$

(4.4) Transform the phase components of all the uplink beam pattern nulls $z_{u,i}$ into their downlink counterpart: $\phi_{d,k}^{(i)}=\phi_{u,k}^{(i)}f_d/f_u$ where $z_{u,k}^{(i)}=A_r e^{j\phi_{u,k}(i)}$;

(4.5) Construct the downlink beam nulls $z_{d,k}^{(i)}:z_{d,k}^{(i)}=A_r e^{j\phi_{d,k}(i)}$;

(4.6) Construct downlink polynomial:

$$h_{d,k}^{(1)}(1-z_{d,k}^{(1)}z^{-1})\Lambda(1-z_{d,k}^{(M-1)}z^{-1}) = \sum_{i=1}^{M} h_{d,k}^{(t)} z^{-t+1},$$

and determine SDCVs by choosing the coefficients of the constructed polynomial.

Similar to IVPW, VPW and SPW algorithms with DCCMs as inputs, shown in FIGS. 5–7, FIGS. 11–13 illustrate IVPW, VPW and SPW algorithms for generating downlink beamforming weights using SDCVs as input, respectively.

Figure 14:
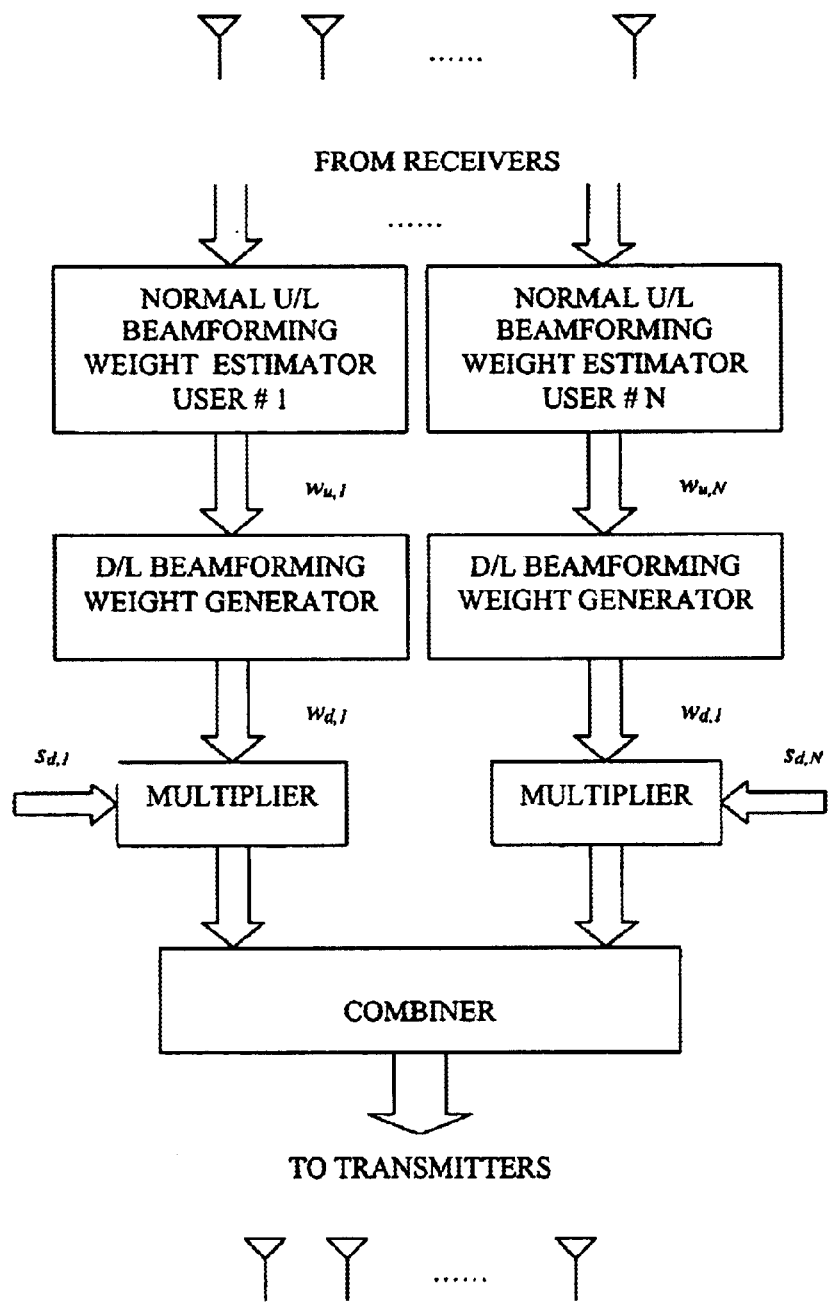
FIG. 14 is a graphic illustration of the downlink beamforming scheme using normal uplink weights in accordance with embodiment 3 of the present invention.

FIG. 14 shows downlink beamforming scheme using normal uplink beamforming weights in accordance with embodiment 3 of the present invention. According to this embodiment, downlink beamforming weights can be generated by direct modifying uplink weights via null constraint method. As uplink beamforming weights are already at hand, the beauty of this embodiment is its simplicity in terms of software and hardware complexities.

Figure 15:
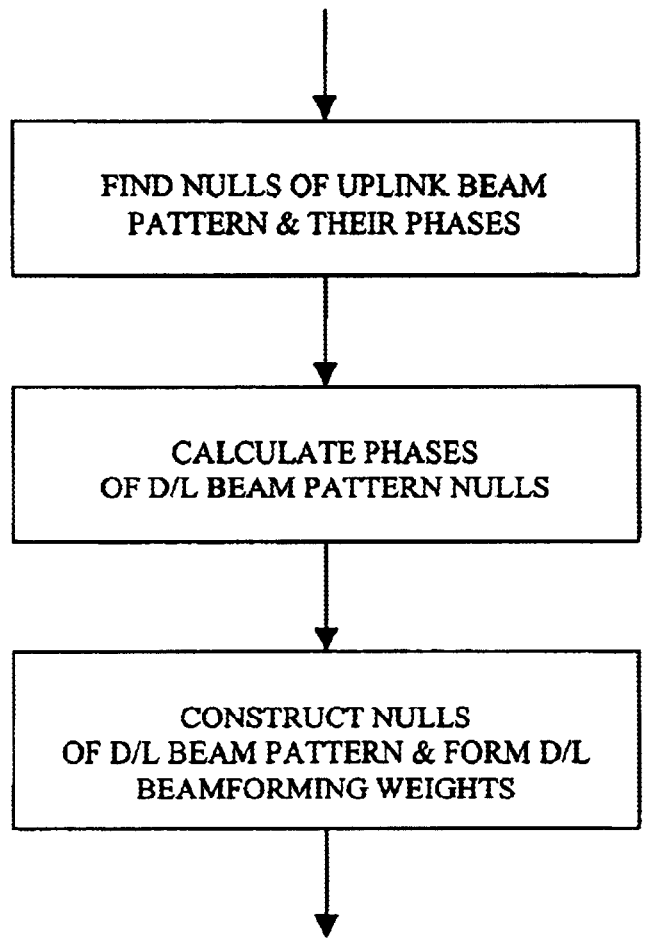
FIG. 15 illustrates one embodiment of downlink beamforming weight generator using normal uplink beamforming weights in accordance with the present invention.

FIG. 15 shows downlink beamforming weight generator based on null constraint method. In fact, uplink beamforming weights are optimal for uplink reception. If the system is time division duplex (TDD), then uplink weights can be used for downlink directly, since uplink beam pattern is the same as downlink beam pattern right here. However, for FDD systems, if uplink weights are used for downlink transmission directly, the null positions and main beam position will be shifted due to different receive and transmit carrier frequencies. Null constraint method designs downlink beamforming weights such that the null positions of downlink beam patters are kept the same as those of the uplink one.

Specifically, null constraint method is described as follows.

(5.1) Determine the uplink beam pattern nulls $z_{u,k}^{(i)}$ from the polynomial formed from uplink weight $$w_{u,k}^{(1)}(1-z_{u,k}^{(1)}z^{-1})\Lambda(1-z_{u,k}^{(M-1)}z^{-1}) = \sum_{i=1}^{M} w_{u,k}^{(i)} z^{-t+1};$$

(5.2) Transform the phase components of all the uplink beam pattern nulls $z_{u,i}$: $\phi_{d,k}^{(i)}=\phi_{u,k}^{(i)}f_d/f_u$ where $z_{u,k}^{(i)}=A_r e^{j\phi_{u,k}(i)}$, (5.3) Construct the downlink beam pattern nulls $z_{d,k}^{(i)}:z_{d,k}^{(i)}=A_r e^{j\phi_{d,k}(i)}$;

(5.4) Construct the downlink polynomial:

$$w_{d,k}^{(1)}(1 - z_{d,k}^{(1)}z^{-1})\Lambda(1 - z_{d,k}^{(M\cdot 1)}z^{-1}) = \sum_{i=1}^{M} w_{d,k}^{(i)} z^{-i+1},$$

and choose the coefficients of the constructed polynomial as downlink beamforming weights.

Figure 16:
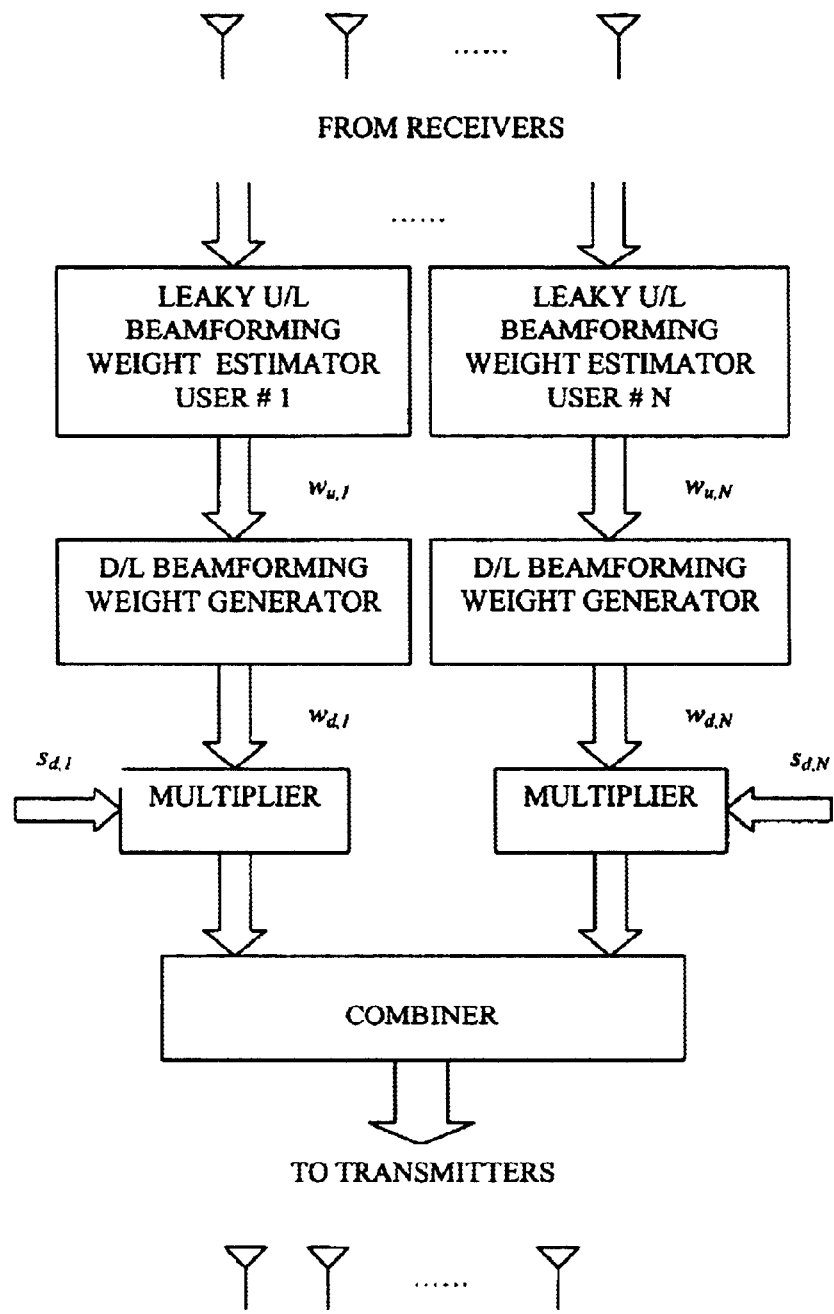
FIG. 16 is a graphic illustration of the downlink beamforming scheme using leaky uplink weights in accordance with embodiment 4 of the present invention.

FIG. 16 shows the downlink beamforming scheme using leaky uplink beamforming weights in accordance with embodiment 4 of the present invention.

Figure 17:
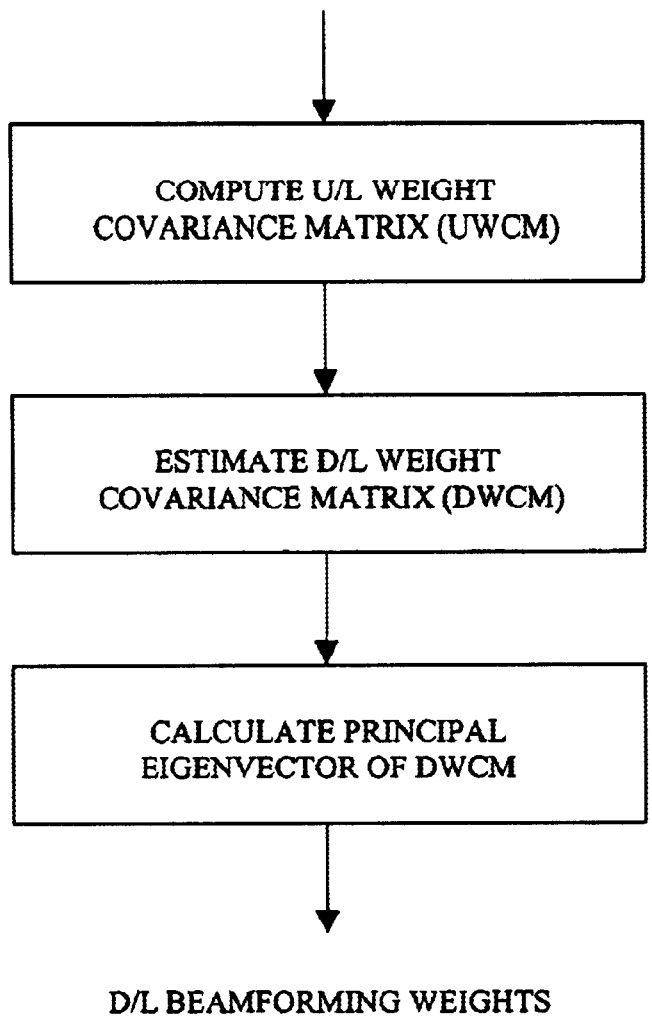
FIG. 17 illustrates one embodiment of downlink beamforming generator using leaky uplink weights in accordance with the present invention.

FIG. 17 shows downlink beamforming weight generator using uplink leaky MMSE (LMMSE) weights. This approach generates downlink beamforming weights by modifying uplink LMMSE weights together with peak constraint method.

Usually, leaky MMSE is used to provide robust uplink beamforming weights. Here, another property of leaky MMSE—beam adjustment, is exploited. As an embodiment, we use a CDMA system to describe the effect of leaky factor. Suppose uplink uses per-user-per-weight beamforming scheme. The cost function for estimating uplink weights is given by $$J=|w^H Y\eta-d|^2+\alpha\|Y\eta\|^2\|w\|^2,$$

where w is the beamforming weight vector (common for all delay paths), $Y=[y_1,K,y_L]$ with $y_i$ being the despread signal vector across the array element in the ith delay path, $\eta=[\eta_1,K,\eta_L]^T$ is the RAKE coefficient vector, d is the training symbol, and $\alpha$ is leaky factor.

The normalized leaky LMS update equation is given by $$w(k+1) = (1-\mu\alpha)w(k) - \mu\frac{z(k)e^*(k)}{z^H(k)z(k)},$$

where $z(k)=Y(k)\eta(k)$, is the composite beamformer input, $e(k)=w^H(k)z(k)-d(k)$, is the error signal. Similarly, we can obtain leaky RLS update equation.

LMMSE is a generalization of the normal MMSE (NMMSE) algorithm, which corresponds to $\alpha=0$. When $\alpha$ is large enough (smaller than the maximum allowed value, same as below), the generating weights are composite uplink channel responses, or so-called MRC weights LMMSE provides a flexible leaky factor for adjusting uplink beam pattern. Specifically, when $\alpha$ is zero, the generated beam pattern simultaneously takes care of the desired user's antenna responses as well as suppression to interference. When $\alpha$ becomes larger, however, the main beam will be getting closer and closer to the desired user's direction, while less consideration will be paid to the suppression to interference. Obviously, for uplink reception, NMMSE gives the best performance and maximum system capacity; and the larger $\alpha$ is, the worse uplink performance becomes.

Here, we are interested in modifying uplink weights for downlink use. According to the present invention, optimal downlink beamforming weights can be generated from uplink LMMSE weights with a moderate leaky factor together with some frequency calibration processing, such as peak constraint algorithm.

If uplink NMMSE weights are used for downlink, with or without peak constraint transform, although the interference can be suppressed in some extent, the desired user's antenna responses will not be well taken care of. Specifically, in some extreme cases, the desired users may fall into the null positions or side lobes of their own beam patterns. This is because that the difference between uplink and downlink carrier frequencies can be as high as 10% or even 20% of the uplink carrier frequency, and that the main beam of the beam pattern generated from the NMMSE weights are usually biased from the actual nominal DOAs, especially when two or more wireless users are spatially closed.

When a LMMSE with large leaky factor is used, a MRC weight vector is generated, whose beam pattern's main beam will direct toward the desired user, if peak constraint transform is added. However, no considerations are paid for interference suppression in this case.

Using peak constraint method, downlink weights obtained by modifying uplink LMMSE weights with moderate leaky factor simultaneously suppress interference in some extent, and form the main beam near the desired user's direction. Keeping in mind that optimal uplink beamforming weights take care of both desired user's antenna responses as well as suppression to interference, we may conclude that LMMSE with moderate leaky factor together with peak constraint method gives optimal downlink beamforming weights.

While the above description contains certain specifications, these should not be considered as limitations on the scope of the invention, but rather as an exemplification of one preferred embodiment and application thereof. It will be apparent to those skilled in the art that various modifications can be made to the downlink beamforming scheme revealed in the present invention without departing from the scope and spirit of the invention. It is intended that the present invention cover modifications and variations of the systems and methods which are from the scope of the appended claims and equivalents.

What is claimed is:

1. A method for downlink capacity enhancement in a wireless communications system comprising a base station with antenna array and terminals that are physically remote from said base station, the method comprising steps of:

receiving at said base station antenna array combinations of arriving signals from said plurality of remote terminals;

estimating an uplink channel covariance matrix (UCCM) for each of said terminals from said combinations of arriving signals;

constructing from each of said UCCM a downlink channel covariance matrix (DCCM);

inputting downlink data rate information (DRRI);

calculating from all said DCCM and DRRI a downlink weight vector for each of said terminals; and transmitting a set of information signals from said base station antenna array according to said downlink weight vectors.

2. The method of claim 1 wherein the estimating step comprises:

forming from said combinations of arriving signals an uplink channel vector for each of said terminals;

establishing a UCCM for each said remote terminal by taking a linear combination of outer products of the corresponding the uplink channel vectors.

3. The method of claim 2 wherein the forming step comprises:

calculating from said combinations of arriving signals and sets of uplink training sequences associated with said remote terminals an uplink minimum mean-square-error (MMSE) weight vector for each said terminals;

assigning said uplink MMSE weight vector as the uplink channel vector for each of said terminals.

4. The method of claim 1 wherein the plurality of remote terminals are CDMA terminals, each of which has an unique PIN code sequence.

5. The method of claim 4 wherein the estimating step comprises:

forming a despread signal for each of said terminals from said combinations of arriving signals and associated PN code sequence; and establishing a UCCM for each said remote terminal by taking a linear combination of outer products of the corresponding despread signal.

6. The method of claim 5 wherein the establishing step comprises:

computing an uplink channel vector for each of said terminals from the associated despread signal and at least one training sequence associated with each remote terminal; and constructing a UCCM for each said remote terminal by taking a linear combination of outer products of the corresponding uplink channel vector.

7. The method of claim 6 wherein the computing step comprises:

calculating an estimated gradient of the error function that includes weighted magnitude square of said uplink channel vector $$|h^H y - d|^2 + \alpha |h|^2$$

where h is the uplink channel vector, y the despread signal, d the training sequence, $\alpha$ a weight constant; and updating said uplink channel vector by adjusting it according to said estimated gradient.

8. The method of claim 5 wherein the establishing step comprises:

computing an uplink minimum mean-square-error (MMSE) weight vector for each of said terminals from the associated despread signal; and constructing a UCCM for each said remote terminal by taking a linear combination of outer products of the corresponding uplink weight vector.

9. The method of claim 8 wherein the computing step comprises:

calculating an estimated gradient of the error function that includes weighted magnitude square of said MMSE weight vector $$|w^H y - d|^2 + \alpha |w|^2$$

where w is the uplink MMSE weight vector, y the despread signal, d the training sequence, $\alpha$ a weighting constant; and updating said uplink MMSE weight vector by adjusting it according to said estimated gradient.

10. The method of claim 1 wherein the constructing step comprises the substeps of:

columnising the said UCCM to a first column vector;

calculating a second column vector by multiplying a frequency calibration matrix $M_A$(FCM-$M_A$) with said first column vector, the FCM-$M_A$, a $n^2 \times m^2$ matrix where m and n are the number of receive and transmit antenna elements, being only dependent on the carrier frequencies, transmit and receive array structures and cell sectorisation; and constructing said DCCM from said second column vector.

11. The method of claim 1, wherein the UCCM is used as the DCCM in the constructing step.

12. The method of claim 1 wherein the constructing step comprises the substeps of:

extracting from the first column and first row of said UCCM to form a first column vector;

calculating a second column vector by multiplying a frequency calibration matrix $M_B$(FCM-$M_B$) with said first column vector, the FCM-$M_B$, a $(n-1) \times (2m-1)$ matrix where m and n are the number of receive and transmit antenna elements, being only dependent on the carrier frequencies, transmit and receive array structures and cell sectorisation; and constructing said DCCM from said second column vector.

13. The method of claim 1 wherein the constructing step comprises the substeps of:

extracting from the first column and first row of said UCCM to form a first column vector;

extracting the real part of said first column vector to form a second column vector and the imaginary part of said first column vector to form a third column vector;

calculating a fourth column vector by multiplying a frequency calibration matrix $M_C$(FCM-$M_C$) with said second column vector, the FCM-$M_C$, a $n \times m$ matrix where m and n are the number of receive and transmit antenna elements, being only dependent on the carrier frequencies, transmit and receive array structures and cell sectorisation;

calculating a fifth column vector by multiplying a frequency calibration matrix $M_D$(FCM-$M_D$) with said third column vector, the FCM-$M_D$, a $(n-1) \times (m-1)$ matrix where m and n are the number of receive and transmit antenna elements, being only dependent on the carrier frequencies, transmit and receive array structures and cell sectorisation;

forming a complex sixth column vector with real part being said fourth column vector and imaginary part being said fifth column vector; and constructing said DCCM from said sixth column vector.

14. The method of claim 1 wherein the downlink weight vector for each of said terminals is the dominant eigenvector of the said DCCM corresponding to the said terminals.

15. The method of claim 1 wherein the calculating step comprises the substeps of:

calculating a channel vector for each of said terminals by taking the dominant eigenvector of the corresponding DCCM; and repeating the steps of:

determining a set of power coefficients from a set of downlink system parameters concerning all mobile terminals that include said downlink weight vectors, said channel vector, downlink information data transmission rate and downlink link quality requirement of each of said terminals;

computing an auto correlation matrix by taking a weighted sum of all DCM corresponding to said terminals according to said set of power coefficients; and forming a downlink weight vector for each of said terminals from said autocorrelation matrix and corresponding DCCM for said terminal, wherein the downlink weight vector has maximal projection onto the corresponding DCCM and minimal projection onto said autocorrelation matrix until the said set of power coefficients and downlink weight vectors have converged.

16. The method of claim 15 wherein said downlink weight vector for each of said terminals is the dominant generalised eigenvector of the corresponding DCCM and said autocorrelation matrix.

17. The method of claim 15 wherein said downlink weight vector for each of said terminals is the dominant eigenvector of a matrix, which is the product of the inverse of said autocorrelation matrix and the corresponding DCCM.

18. The method of claim 15 wherein said downlink weight vector for each of said terminals is the product of the inverse of said autocorrelation matrix and the said corresponding channel vector.

19. The method of claim 1 wherein the calculating step comprises the substeps of:
- calculating a channel vector for each of said terminals by taking the dominant eigenvector of the corresponding DCCM;
- determining a set of power coefficients from a set of downlink system parameters concerning all mobile terminals that include said channel vector, downlink information data transmission rate and downlink link quality requirement of each of said terminals;
- computing an autocorrelation matrix by taking a weighted sum of all DCCM corresponding to said terminals according to said set of power coefficients; and
- forming a downlink weight vector for each of said terminals from said autocorrelation matrix and corresponding DCCM for said terminal, wherein the downlink weight vector has maximal projection onto the corresponding DCCM and minimal projection onto said autocorrelation matrix.

20. A method for downlink capacity enhancement in a wireless communications system comprising a base station with antenna array and terminals that are physically remote from said base station, the method comprising steps of:
- receiving at said base station antenna array combinations of arriving signals from said plurality of remote terminals, wherein the plurality of remote terminals are CDMA terminals, each of which has an unique PN code sequence;
- estimating an uplink weight vector for each of said terminals from said combinations of arriving signals including the steps of:
  - forming a despread signal for each of said terminals from said combinations of arriving signals and said associated PN code sequence; and
  - computing said uplink weight vector from corresponding despread signal;
- constructing from each of said uplink weight vector a downlink weight vector;
- transmitting the set of information signals from said base station antenna array according to said downlink weight vectors;
- wherein the computing step comprises:
  - calculating a estimated gradient of the error function that includes weighted magnitude square of said uplink weight vector $|w^H y - d\uparrow^2 + \alpha|w|^2$ where w is the uplink MMSE weight vector, y the despread signal, d the training sequence, $\alpha$ a weighting constant; and
  - updating said uplink MMSE weight vector by adjusting it according to said estimated gradient.

21. A method for downlink capacity enhancement in a wireless communications system comprising a base station with antenna array and terminals that are physically remote from said base station, the method comprising steps of:
- receiving at said base station antenna array combinations of arriving signals from said plurality of remote terminals;
- estimating an uplink weight vector for each of said terminals from said combinations of arriving signals;
- constructing from each of said uplink weight vector a downlink weight vector;
- transmitting the set of information signals from said base station antenna array according to said downlink weight vectors; and
- wherein the constructing step comprises:
  - determining the zeros of the polynomial whose coefficients are the elements of the uplink weight vector;
  - forming new polynomial zeros by scaling the phase of said zeros by a factor that is related to the ratio of the downlink frequency to the uplink frequency; and
  - establishing said downlink weight vector by constructing a new polynomial using said new polynomial zeros and using the coefficients of said new polynomial as the elements of said downlink weight vector.

22. A method for downlink capacity enhancement in a wireless communications system, comprising a base station with antenna array and terminals that at are physically remote from said base station, the method comprising steps of:
- receiving at said base station antenna array combinations of arriving signals from said plurality of remote terminals;
- estimating an uplink channel vector for each of said terminals from said combinations of arriving signals;
- constructing from each of said uplink channel vector a downlink channel vector;
- inputting downlink data rate information (DDRI);
- calculating from all said downlink channel vector and DDRI a downlink weight vector for each of said terminals; and
- transmitting the set of information signals from said base station antenna array according to said downlink weight vectors.

23. The method of claim 22 wherein the plurality of remote terminals are COMA terminals, each of which has an unique PN code sequence.

24. The method of claim 23 wherein the estimating step comprises:
- forming a despread signal for each of said terminals from said combinations of arriving signals and said associated PN code sequence; and
- computing said uplink channel vector from corresponding despread signal.

25. The method of claim 24 wherein the computing step comprises:
- calculating an estimated gradient of the error function that includes weighted magnitude square of said uplink channel vector $|h^H y - d|^2 + \alpha |h|^2$ where h is the uplink channel vector, y the despread signal, d the training sequence, $\alpha$ weighting constant; and
- updating said uplink channel vector by adjusting it according to said estimated gradient.

26. The method of claim 24 wherein the computing step comprises: establishing a UCCM for each said remote terminal by taking a linear combination of outer products of the corresponding despread signal; and forming the uplink channel vector for each said remote terminal by taking the dominant eigenvector of corresponding said UCCM.

27. The method of claim 22 wherein the constructing step comprises:
- determining the zeros of the polynomial whose coefficients are the elements of the uplink channel vector;

forming a new polynomial zeros by scaling the phase of said zeros by a factor that is related to the ratio of the downlink frequency to the uplink frequency; and establishing said downlink channel vector by constructing a new polynomial using said new polynomial zeros and using coefficients of said new polynomial as the elements of said downlink channel vector.

28. The method of claim 22 wherein the uplink channel vector is used as the downlink channel vector in the constructing step.

29. The method of claim 22 wherein the downlink channel vector for each of said terminals is used as the corresponding downlink weight vector.

30. The method of claim 22 wherein the calculating step comprises repeating the substeps of:

determining a set of power coefficients from a set of downlink system parameters concerning all mobile terminals that include said downlink weight vectors, said downlink channel vector, downlink information data transmission rate and downlink link quality requirement of each of said terminals;

computing an autocorrelation matrix by taking a weighted sum of the outer products of said downlink channel vectors corresponding to said terminals according to said set of power coefficients and downlink information data transmission rates; and forming a downlink weight vector for each of said terminals by taking the product of the inverse of said autocorrelation matrix and corresponding said downlink channel vector until the said set of power coefficients and downlink weight vectors have converged.

31. The method of claim 22 wherein the calculating step comprises the substeps of:

determining a set of power coefficients from a set of downlink system parameters concerning all mobile terminals that include said downlink weight vectors, said downlink channel vector, downlink information data transmission rate and downlink link quality requirement of each of said terminals;

computing an autocorrelation matrix by taking a weighted sum of the outer products of said downlink channel vectors corresponding to said terminals according to said set of power coefficients and downlink information data transmission rates; and forming a downlink weight vector for each of said terminals by taking the product of the inverse of said autocorrelation matrix and corresponding said downlink channel vector.

32. A base station for a wireless communications system, the base station comprising:

an uplink receive antenna array for receiving arriving signals from a plurality of remote terminals on respective uplink channels;

an uplink weight generator for estimating an uplink channel covariance matrix (UCCM) for each of said uplink channels;

a downlink weight generator operable to derive, from each of said UCCM, downlink weights, by constructing for each of said UCCM a downlink channel convergence matrix (DCCM), accepting inputted downlink data rate information (DDRI) and calculating from all DCCM and DDRI a downlink weight vector for each of said terminals; and a downlink transmit antenna array to transmit signals to the remote terminals in accordance with the desired downlink weights.

33. A base station according to claim 32, wherein the uplink receive antenna array is the same as the downlink transmit antenna array.

34. A base station according to claim 32, wherein the uplink receive antenna array is separate from the downlink transmit antenna array.

35. A base station according to claim 32, wherein the property of the uplink channel comprises at least one of the uplink channel covariance matrices, the uplink channel responses or the uplink beamforming weights.

36. A base station according to claim 32, wherein uplink spatial- de-multiplexing means and downlink spatial multiplexing means are provided.

37. A communication system incorporating a base station according to claim 32 and plurality of remote terminals.

* * * * *